United States Patent
Kaeb et al.

(10) Patent No.: US 6,170,646 B1
(45) Date of Patent: Jan. 9, 2001

(54) CLEATED BELT ADAPTABLE TO CURVILINEAR SHAPES

(76) Inventors: Todd Kaeb, 170 N. 800 East Rd., Loda, IL (US) 60948; Les Kaeb, 320 N. 1000 East Rd., Cissna Park, IL (US) 60924

( * ) Notice: Under 35 U.S.C. 154(b), the term of this patent shall be extended for 0 days.

(21) Appl. No.: 09/275,115

(22) Filed: Mar. 24, 1999

(51) Int. Cl.⁷ .................................................. B65G 15/40
(52) U.S. Cl. .......................................... 198/821; 198/819
(58) Field of Search ................................ 198/716, 690.2, 198/699, 847, 808, 819, 820, 821

(56) References Cited

U.S. PATENT DOCUMENTS

| | | | |
|---|---|---|---|
| 2,212,024 | 8/1940 | Johns | 198/195 |
| 2,303,762 | 12/1942 | Reimel | 198/198 |
| 3,326,354 | 6/1967 | Aydelott | 198/184 |
| 3,595,378 | * 7/1971 | Kamisaka | 198/819 |
| 4,953,690 | 9/1990 | Herzke | 198/690 |
| 5,511,652 | 4/1996 | McGinnis | 198/819 |

FOREIGN PATENT DOCUMENTS

| | | | |
|---|---|---|---|
| 323803 | * 9/1957 | (CH) | 198/821 |
| 941477 | * 4/1956 | (DE) | 198/820 |
| 958549 | * 2/1957 | (DE) | 198/821 |
| 1358636 | * 3/1963 | (FR) | 198/819 |

* cited by examiner

*Primary Examiner*—James R. Bidwell
(74) *Attorney, Agent, or Firm*—Knechtel, Demeur & Samlan

(57) ABSTRACT

A conveyor belt that uses cleats to more effectively transfer materials through a curvilinear structure into a deposit receptacle. The cleats are either in the form of a notched cleat or slit cleat. In both forms, the cleat is adaptable to conforming from a flat conveyor belt to a curved conveyor belt within the curvilinear structure. The resulting cleat on the conveyor belt provides increased support for the prevention of backflow of materials during transportation of the materials through the curvilinear structure.

6 Claims, 4 Drawing Sheets

CLEATED BELT ADAPTABLE TO CURVILINEAR SHAPES

I. FIELD OF THE INVENTION

The present invention relates to conveyor belts and, more particularly, to conveyor belts having cleats that are adaptable to curvilinear shapes upon the conveyor belt entering into and moving through curvilinear structures.

II. DESCRIPTION OF THE PRIOR ART

Conveyor transported materials such as grain, ash or foundry dust are best moved by a conveyor equipped with a cleated belt. Even with a cleated belt, however, such material is susceptible to shifting due to gravity and vibration, and from blowing air while in transit along the conveyor belt. These challenges are magnified when transporting materials through an incline, e.g., blowing air is more likely to be found at elevations than at ground level and gravity causes the material to back slide along the conveyor belt, thereby, reducing system efficiency.

Over the years, several attempts have been made to address the problem. Most commonly, the solution is to enclose the conveyor belt within a curvilinear structure, such as a tube. This approach generally requires the use of an uncleated belt since traditional cleats will not appropriately conform to the tube circumference. Therefore, while solving the blowing air concerns, this solution does not address the problem of back sliding due to gravity.

Attempts have been made to create a conveyor belt having means to prevent back sliding of material. One such example is seen in U.S. Pat. No. 5,511,652 to McGinnis for a "Construction Conveyor Belt" which discloses a conveyor belt that can fold upwardly and inwardly along its lateral edges to conform to a tube. However, this device relies upon fixed cleats that do not extend from the lateral edges of the belt. Accordingly, material can be trapped on the sides of the cleats, thereby limiting the ability of the belt to form a circle.

Another example is seen in U.S. Pat. No. 4,953,690 to Herzke for a "Conveyor with Slippage Stops on the Conveyor Surface" which discloses a flat conveyor having a plurality of stops or cleats spaced longitudinally apart on the conveyor surface for engaging material carried by the conveyor belt. While useful for preventing or halting slippage of the material on the conveyor belt, the device employs only small cleats which are not capable of stopping significant back fall when the material is moved on an incline. More importantly, however, the device does not permit the belt to conform to curvilinear shapes.

U.S. Pat. No. 3,595,378 to Kamisaka for a "Tubular Belt Conveyor" discloses a conveyor which is completely tubular in shape. Within the interior of the tubular conveyor is a rubber belt that is moved through the tubular conveyor using sprockets. Secured to the rubber belt are preventing plates similar to cleats to transfer material. Although the device is curvilinear in shape and uses cleats to transfer material within the curvilinear shape, the device is devoid of transforming a flat conveyor belt into a curvilinear structure having cleats that are adaptable for use in both situations.

U.S. Pat. No. 3,326,354 to Aydelott for a "Belt Conveyor" discloses a flexible conveyor belt for conveying semi-fluid materials through a tube. The tube shaped conveyor belt opens to receive the materials, close to form a tube where paddles affixed to the belt partition the tube shaped belt into sections to contain the material, and then opened to release the material. A shortcoming of this patent is that the paddles are static through the tube and incapable of transforming from a flat conveyor belt into curvilinear shapes. A further shortcoming of this device is that it requires multiple pieces and is, therefore, expensive to manufacture.

U.S. Pat. No. 2,303,762 to Reimel for a "Conveyor Belt" discloses a conveyor belt with cross ridges separated by grooves along the conveyor belt surface to distribute material uniformly over the surface of the belt. The cross ridges have abrupt sides with inclined surfaces to contain the material. Although the conveyor belt is capable of forming into curvilinear shapes, the device does not have cleats that are adaptable for travel through curvilinear structures.

U.S. Pat. No. 2,212,024 to Johns for a "Tubular Belt Conveyer" discloses a conveyor belt that can be formed into a tube shape while traveling along pulleys. The conveyor belt has a plurality of ribs within the inner face of the conveyor belt to retain material from slipping while inside the tube. A shortcoming of this conveyor belt is that while it is capable of forming a curvilinear shape, the ribs within the device are static and not capable of transforming into a unified rib within the curvilinear shape to prevent the back flow of transported material.

As illustrated by the prior art, there is a need for a conveyor belt having cleats that is effective in a flat position yet is adaptable to curvilinear structures.

OBJECTS OF THE INVENTION

It is the primary object of the present invention to provide a conveyor belt having cleats on the surface of the conveyor belt, the cleats capable of functioning when the conveyor belt is in a flat position yet are adaptable to a curvilinear shape established by a curvilinear structure, such as a tube.

Another object of the present invention is to provide cleats to transfer suitable materials placed on a flat conveyor belt through any variation of curvilinear structures.

Still another object of the invention is to provide a system to transfer material at greater angles than conveyors with a smooth or textured belt. A related object of the invention is to maintain greater capacities of material at a given segment of the conveyor belt while in transit through curvilinear structures.

Other objects of the present invention will become more apparent to persons having ordinary skill in the art to which the present invention pertains from the following description taken in conjunction with the accompanying drawings.

SUMMARY OF THE INVENTION

The above objects of the present invention are provided for in a conveyor belt having cleats adaptable for transporting material through a curvilinear structure. According to the invention, cleats are affixed at predetermined locations and perpendicular to the surface of a flat conveyor belt. The cleats further being provided with either notches or slits. As the flat conveyor belt is directed through a curvilinear structure, both the conveyor belt and cleats adapt to the shape of the curvilinear structure. The notches or slits of the cleat enable it to form a solid cleat wall, thereby, preventing materials from sliding on the conveyor belt during movement of the conveyor belt through the structure.

BRIEF DESCRIPTION OF THE DRAWINGS

The Description of the Preferred Embodiment will be better understood with reference to the following figures.

DETAILED DESCRIPTION OF THE PREFERRED EMBODIMENT

Figure 1:
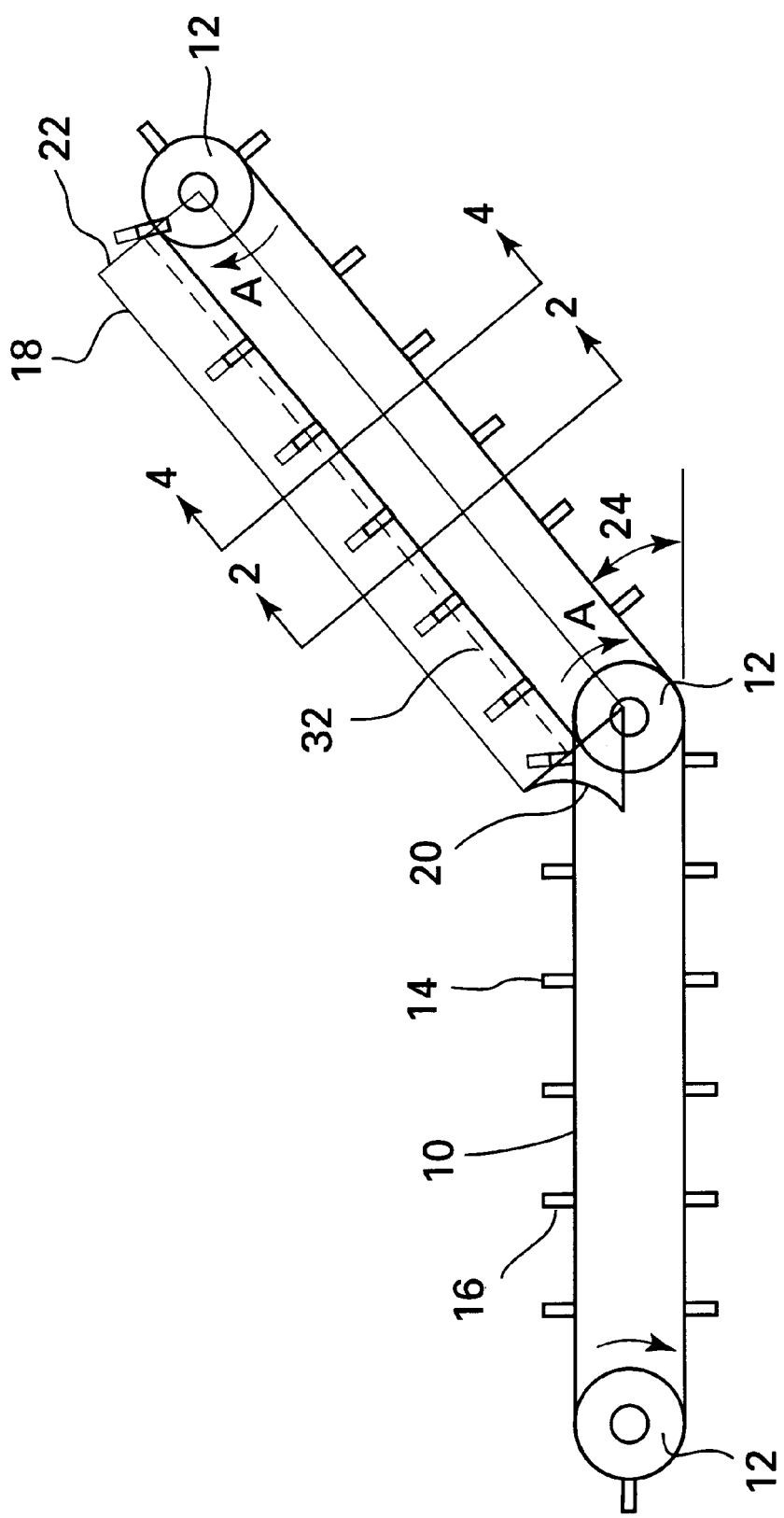
FIG. 1 is a side view of a conveyor belt illustrated in its operational form.

Turning first to FIG. 1, conveyor belt 10 is illustrated in its operational form. Conveyor belt 10 is rotated around guide rollers 12. Guide rollers 12 rotate in the direction of the directional arrows A. Conveyor belt 10 has cleats 14. The number and spacing of cleats 14 used on conveyor belt 10 depend upon the length and use of conveyor belt 10. Additionally, each cleat 14 is preferably spaced equi-distant from all other cleats 14 along conveyor belt 10. Cleats 14 extend perpendicularly from conveyor belt 10 and have cleat height 16. Cleat height 16 is preferably set at a height suitable to prevent materials from back sliding on conveyor belt 10 or to maintain larger quantities of materials being transported along conveyor belt 10. Conveyor belt 10 is used to transport all types of materials including but not limited to: fruits and vegetables, corn, seed, soybeans, ash, and foundry dust.

In many settings, material must be transported horizontally through a work area or through an incline to reach a designated deposit receptacle. For either situation, the material may be required to be covered while transported.

In such situations, conveyor belt 10 enters into curvilinear structure 18 at entrance 20 and exits curvilinear structure 18 at exit 22. An example of a curvilinear structure 18 is a tube or cylinder. The curvilinear structure 18 should preferably maintain a constant linear shape where it contacts conveyor belt 10. Curvilinear structure 18 need only to encompass that portion of the conveyor belt 10 transporting the materials. It is during the period that the curvilinear structure 18 and cleats 14 combine to effectively transfer and protect the materials. Alternatively, although unnecessary except to protect the conveyor belt 10 and cleats 14, curvilinear structure 18 could encompass that portion of conveyor belt 10 and cleats 14 returning to collect and transfer more materials.

Figure 2:
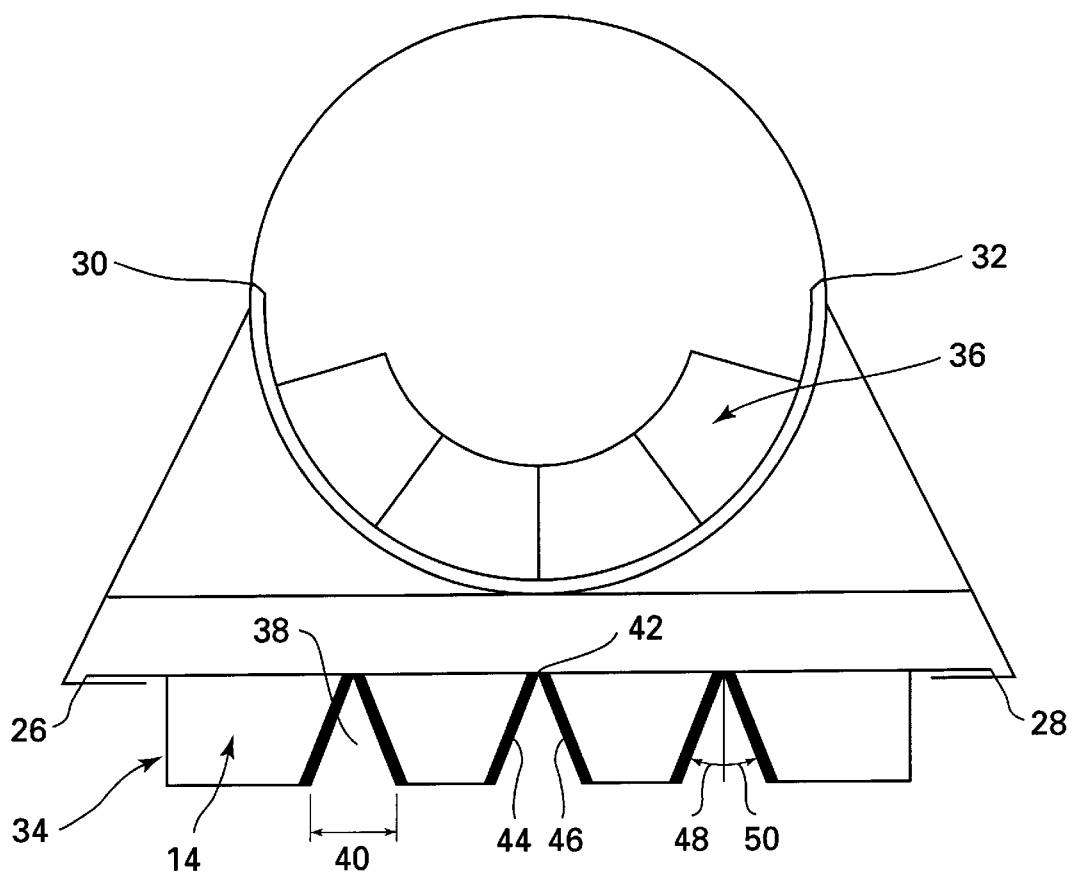
FIG. 2 is an end perspective view of the notched cleat in its curvilinear shape taken along line 2—2 of FIG. 1.
Figure 4:
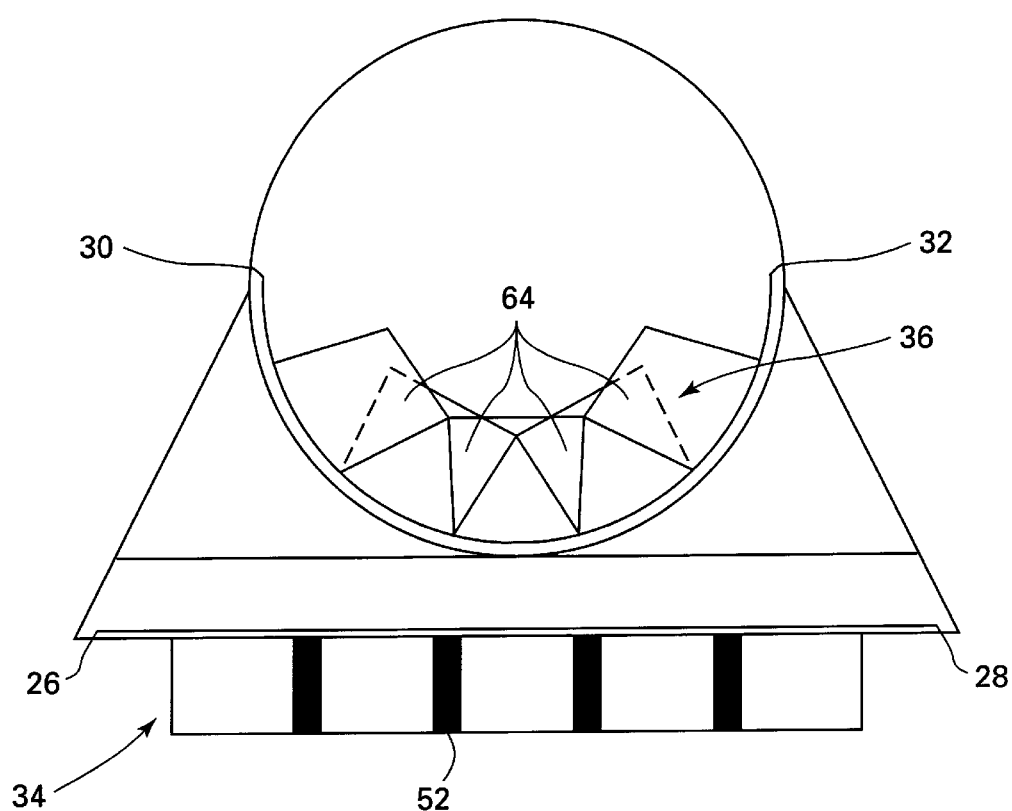
FIG. 4 is an end perspective view of the slit cleat in its curvilinear shape taken along line 4—4 of FIG. 1.

As depicted in FIG. 1, conveyor belt 10 is typically flat prior to entering into curvilinear structure 18. As conveyor belt 10 begins to enter curvilinear structure 18 at entrance 20, conveyor belt 10 folds to meet the contour of curvilinear structure 18. Conveyor belt 10 has side ends 26 and 28 (FIGS. 2 and 4). As side ends 26 and 28 enter entrance 20, side ends 26 and 28 of the flat conveyor belt 10 fold upwardly and inwardly to form to the contour of curvilinear structure 18. The folded side ends 26 and 28 are repositioned to folded points 30 and 32 (FIGS. 2 and 4). Conveyor belt 10 is moved completely through curvilinear structure 18 to exit 22 where the materials are finally deposited into a truck, silo, box, another conveyor belt, or any other deposit receptacle. Curvilinear structure 18 serves to prevent air and any other disrupting means, natural or unnatural, from impeding the transfer of various types of materials along conveyor belt 10 to exit 22.

FIG. 1 also illustrates conveyor belt 10 at an incline as represented by angle 24 to the horizontal. Angle 24 represents the angle at which conveyor belt 10 may be positioned to deposit materials transported by conveyor belt 10 into a truck, silo, or box. The appropriate angle 24 is determined by the height of the truck, silo, or box and the length of the conveyor belt 10. Alternatively, conveyor belt 10 need not be at an incline to transport materials through a curvilinear structure. In this instance, angle 24 would be zero. Examples of such situations include work areas and other environments where the transported materials should be protected from air particles and other impurities.

In addition to conveyor belt 10 conforming to the contour of curvilinear structure 18, cleats 14 also adapt along with conveyor belt 10 to conform to the contour of the curvilinear structure 18. Applicant's invention is accomplished through two alternate embodiments. The first embodiment is illustrated in FIG. 2, the second embodiment is illustrated in FIG. 4.

Figure 3:
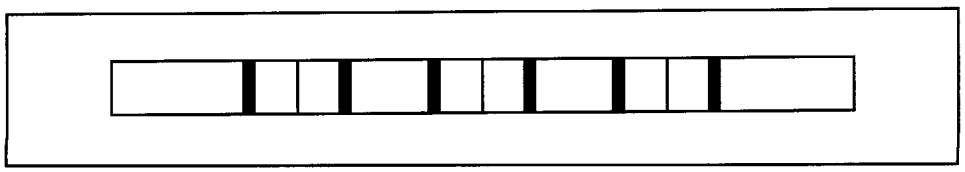
FIG. 3 is a top view of the notched cleat in its flat configuration.

As seen in FIG. 2, cleat 14 is illustrated in flat configuration 34 and in curvilinear configuration 36. In this embodiment, cleat 14 has notches 38 as shown in the flat configuration 34. For illustration purposes, cleat 14 has three notches 38. This is not critical; the number of notches 38 is dependent upon the width of the conveyor belt 10 and the size of the curvilinear structure 18. Notches 38 are essentially V-shaped with notch width 40 tapering to notch end 42 where cleat 14 is attached to conveyor belt 10. Notches 38 have sides 44 and 46. Preferably, side 44 is a mirror image of side 46. From notch end 42, sides 44 and 46 are at notch angles 48 and 50, respectively, with respect to conveyor belt 10. Notch angle 48 should be approximately equal to notch angle 50. Also, notches 38 may be beveled as illustrated in FIG. 3.

Figure 5:
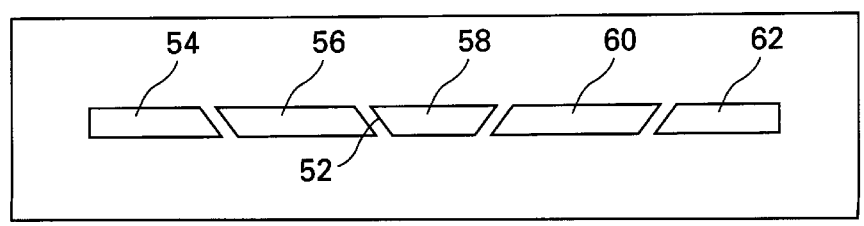
FIG. 5 is a top view of the slit cleat in its flat configuration.

Turning to the second embodiment in FIG. 4, cleat 14 is again illustrated in the same flat configuration 34 and curvilinear configuration 36. In this embodiment, cleat 14 has slits 52. The slits 52 are best shown in FIG. 5. The number of slits 52 again depends on the width of belt 10 and size of curvilinear structure 18. For illustration purposes, four slits 52 are represented. Upon creation of the slits 52, cleat 14 is divided into sections 54, 56, 58, 60, and 62. The spacing between sections for each slit 52 should be constant if curvilinear structure 18 is round. Other slit configurations may be beneficial curvilinear structure 18 is not round. Slits 52 between sections 54 and 56 are aligned parallel to slits 52 between sections 56 and 58. Similarly, slits 52 between sections 58 and 60 are aligned parallel to slits 52 between sections 60 and 62. However, slits 52 between sections 54 and 56 and sections 56 and 58 are a mirror image or cut in the opposite direction to slits 52 between sections 58 and 60 and sections 60 and 62. In practice, slits are generally formed by making a tapered cut into cleats 14.

During the transition of cleats 14 from flat configuration 34 to curvilinear configuration 36, cleats 14 conform to the curvilinear shape along with the conveyor belt 10 which is established by curvilinear structure 18. In the notches cleat embodiment, the spacing within the notch 38 is closed as sides 44 and 46 rotate upwardly and inwardly with the conveyor belt 10 and made flush with one another. In the illustration of FIG. 2, all three notches 38 would close simultaneously. When each notch 38 is closed in this manner, cleat 14 is transformed into curvilinear configuration 36.

In the slit cleat embodiment, as the sections of cleat 14 rotate to conform to curvilinear structure 18 in conjunction with conveyor belt 10, slits 52 permit the surfaces of each section to overlap with the surfaces of its adjacent section at overlap points 64. Section 58 of cleat 14 remains primarily stable at the base of curvilinear structure 18.

In both embodiments, cleat 14 becomes a solid wall for the duration of time that conveyor belt 10 is within the curvilinear structure 18. The resultant cleat 14 in the curvilinear configuration 36 helps to prevent the back sliding of material along conveyor belt 10.

Figure 6:
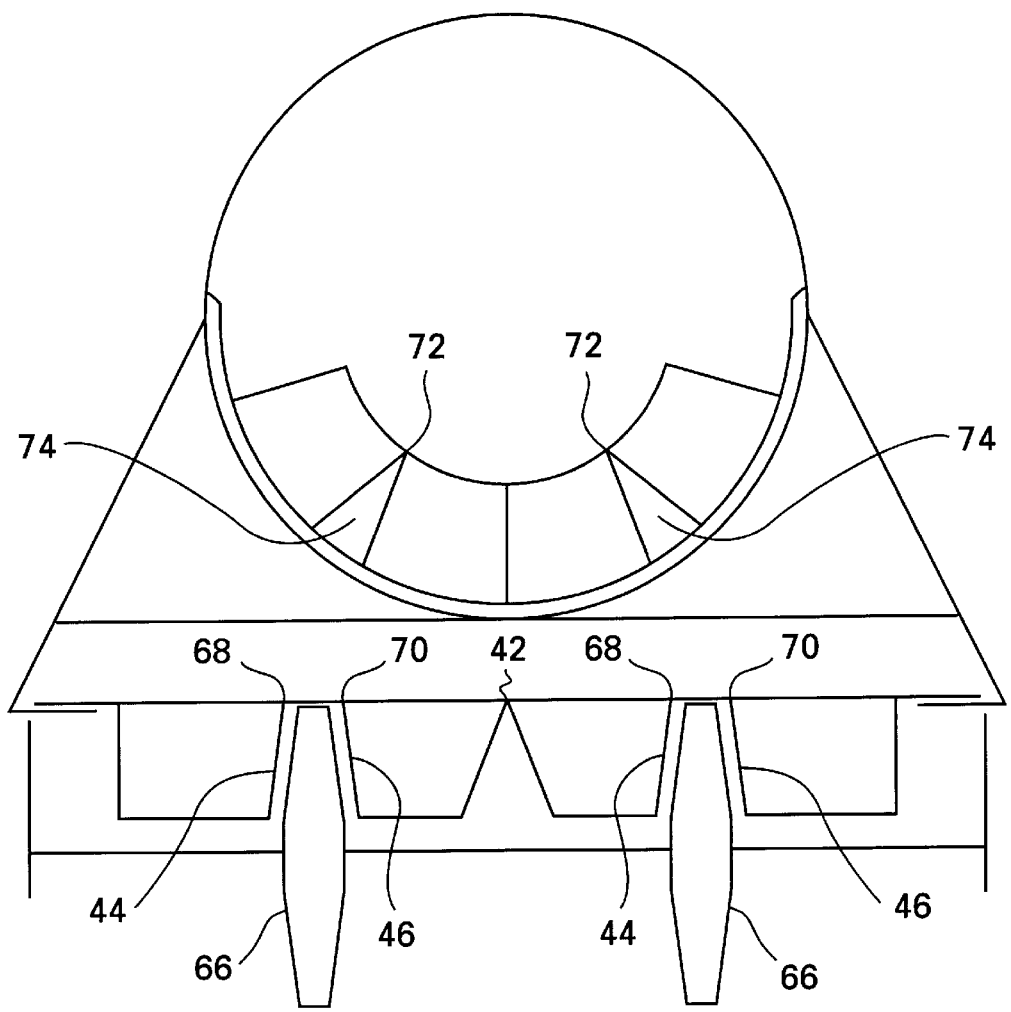
FIG. 6 is an alternate end perspective of a roller guide - notched cleat taken along line 2—2 of FIG. 1.

Alternatively, in a roller guide—notched cleat embodiment as illustrated in FIG. 6, the conveyor belt system may employ rollers 66 to guide conveyor belts 10. In such a situation, notches 38 are not all V-shaped, but rather, some are required to be U-Shaped in order to accommodate rollers 66. In the U-shaped notches 38 with rollers 66, sides 44 and 46 of notches 38 in cleats 14 do not taper to notch end 42. Sides 44 and 46 are instead attached to conveyor belt 10 at side ends 68 and 70. The spacing between sides 44 and 46 in the U-shaped notches 38 permits rollers 66 access through notches 38 in the cleat 14 and allows rollers 66 to contact conveyor belt 10 without cleats 14 acting as an obstacle to the movement of conveyor belt 14. Upon transition of the notched cleat embodiment in a conveyor system with rollers 66, the V-shaped notches 38 close as discussed above. Sides 44 and 46 of the U-shaped notches 38 also close, but contact one another at edge 72 only. The remainder of sides 44 and 46 do not become flush with one another as in the V-shaped notches 38. As a result, the U-shaped notches 38 permit a gap 74 between sides 44 and 46 while cleats 14 remain in conformance with the curvilinear shape established by the curvilinear structure 18. The principle of the invention is still intact inasmuch as conveyor belts 10 and cleats 14 conform to curvilinear structures 18 and continue to maintain an essentially continuous cleat wall while within the curvilinear structure.

The notches cleat embodiment is preferred to the slit cleat embodiment in situations where conveyor belt 10 is moved through round curvilinear structures 18. Although, it is more expensive to manufacture than the slit version. Additionally, the beveled portion of notches 38 provide increased support to hold material on conveyor belt 10.

Alternatively, the slit cleat embodiment is preferred to the notches cleat embodiment in situations where conveyor belt 10 is moved through larger curvilinear structures 18 or structures that may not be round, e.g., oval. The slit cleat embodiment is more useful than the notched cleat embodiment where a narrow conveyor belt 10 is being used. Also, the slit cleat embodiment provides a stronger forming wall with all the sections overlapping with one another. This provides both a longer lasting cleat and a cleat that will more easily enable the transfer of heavier materials.

Thus, there has been provided a conveyor belt that utilizes a cleat that is adaptable to conforming to curvilinear structures. While the invention has been described in conjunction with two specific embodiments, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. In a conveyor system having guide rollers around which a conveyor belt moves, the conveyor belt having a bottom surface that contacts the guide rollers as the conveyor belt moves around the guide rollers, the guide rollers moving the conveyor belt essentially horizontally or at an incline and a curvilinear structure encompassing the conveyor belt for at least a portion of the conveyor system, the structure having an entrance end and an exit end, the conveyor belt entering the structure through the entrance end and exiting the structure through the exit end, and a cleated belt, the improvement comprising:

a conveyor belt, the conveyor belt having a top surface and a bottom surface, and a plurality of cleats attached to the top surface of the conveyor belt, the cleats extending perpendicular from the top surface of the conveyor belt and forming a front end and a back end, the cleats containing slits, each slit having two parallel sides and defining an opening in the front end of adjacent cleats and an exit at the back end of the adjacent cleats, the slit being formed into the cleats such that the slit is tapered from a first position in the opening in the front end of the cleats to a different second position in the back end of the cleats, the slits enabling the cleats to transform from a flat surface of a conveyor belt to the curvilinear structure to create a wall preventing the backflow of materials along the conveyor belt within the curvilinear structure.

2. A cleated belt adaptable to curvilinear structures, comprising:

a conveyor belt, the conveyor belt having an outer surface and an inner surface, and a plurality of cleats extending outwardly from the outer surface of the conveyor belt, the cleats further having notches which enable the cleat to adapt to the shape of a curvilinear structure, each notch having two beveled sides with each side being a mirror image of the other; and whereby, the cleats enable transformation from a flat surface of a conveyor belt to various shapes within the curvilinear structure.

3. The cleated belt of claim 2 wherein each side of the notches taper to a notch end and are at a notch angle with respect to the outer surface of the conveyor belt, the notch angle of each side being approximately equal with respect to the notch end.

4. A cleated belt adaptable to curvilinear structures, comprising:

a conveyor belt, the conveyor belt having a top surface and a bottom surface, and a plurality of cleats aligned in approximately a linear plane and extending outwardly from the top surface of the conveyor belt and forming a front end and a back end, the cleats further having slits which enable the cleats to adapt to the shape of a curvilinear structure, each slit having two parallel sides and defining an opening in the front end of adjacent cleats and an exit at the back end of the adjacent cleats, the slit being formed into the cleats such that the slit is tapered from a first position in the opening in the front end of the cleats to a different second position in the back end of the cleats; and whereby, the cleats enable transformation from a flat surface of a conveyor belt to various shapes within the curvilinear structure.

5. The cleated belt of claim 4 wherein the slits in the cleat divide the cleat into an odd number of sections with a center section cleat acting to separate the remaining sections into a first group of sections and a second group of sections, the first group of sections containing identical slits between the sections which taper in a different direction than the identical slits between the sections in the second group.

6. In a conveyor system having guide rollers around which a conveyor belt moves, the conveyor belt having a bottom surface that contacts the guide rollers as the conveyor belt moves around the guide rollers, the guide rollers moving the conveyor belt essentially horizontally or at an incline and a curvilinear structure encompassing the conveyor belt for at least a portion of the conveyor system, the structure having an entrance end and an exit end, the conveyor belt entering the structure through the entrance end and exiting the structure through the exit end, and a cleated belt, the improvement comprising:

a conveyor belt, the conveyor belt having a top surface and a bottom surface, and a plurality of cleats attached to the top surface of the conveyor belt, the cleats extending perpendicular from the top surface of the conveyor belt, the cleats containing notches, each notch having two beveled sides with each side being a mirror image of the other, the notches enabling the cleats to transform from a flat surface of a conveyor belt to the curvilinear structure to create a wall preventing the backflow of materials along the conveyor belt within the curvilinear structure.

* * * * *